(12) United States Patent
Ellison (10) Patent No.: US 7,441,806 B2
(45) Date of Patent: Oct. 28, 2008

(54) KNEE BOLSTER

(75) Inventor: Patrick J. Ellison, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/552,428

(22) Filed: Oct. 24, 2006

(65) Prior Publication Data

US 2008/0093831 A1     Apr. 24, 2008

(51) Int. Cl.
B60R 21/045      (2006.01)

(52) U.S. Cl. .................................. 280/752; 280/751

(58) Field of Classification Search ............... 280/751, 280/752
See application file for complete search history.

(56) References Cited

U.S. PATENT DOCUMENTS

| | | | |
|---|---|---|---|
| 3,930,665 A | | 1/1976 | Ikawa |
| 3,931,988 A | * | 1/1976 | Oehm et al. ............... 280/807 |
| 4,709,943 A | | 12/1987 | Yoshimura et al. |
| 4,893,834 A | | 1/1990 | Honda et al. |
| 5,037,130 A | | 8/1991 | Okuyama |
| 5,201,544 A | | 4/1993 | Matano et al. |
| 5,273,314 A | | 12/1993 | Sakakibara |
| 5,370,417 A | | 12/1994 | Kelman et al. |
| 5,549,327 A | | 8/1996 | Rüsche et al. |
| 5,593,182 A | | 1/1997 | Frost |
| 5,632,507 A | | 5/1997 | Sinner et al. |
| 5,720,510 A | | 2/1998 | Daniel et al. |
| 5,826,907 A | * | 10/1998 | Saito et al. ............... 280/808 |
| 5,836,641 A | * | 11/1998 | Sugamoto et al. ......... 296/187.05 |
| 5,865,468 A | | 2/1999 | Hur |
| 6,086,098 A | | 7/2000 | Reiter et al. |
| 6,170,872 B1 | | 1/2001 | Bair et al. |
| 6,199,942 B1 | | 3/2001 | Carroll, III et al. |
| 6,302,437 B1 | | 10/2001 | Marriott et al. |
| 6,312,008 B1 | * | 11/2001 | Neag ....................... 280/728.2 |
| 6,609,727 B2 | | 8/2003 | Figlioli et al. |
| 6,793,246 B2 | * | 9/2004 | Horsch ....................... 280/751 |
| 6,866,294 B2 | | 3/2005 | Horsch et al. |
| 7,275,764 B2 | * | 10/2007 | Yamada et al. ............. 280/752 |
| 2003/0057692 A1 | | 3/2003 | Horsch et al. |
| 2003/0057760 A1 | | 3/2003 | Horsch |
| 2003/0184070 A1 | | 10/2003 | Vidal et al. |
| 2004/0056463 A1 | | 3/2004 | Marks et al. |
| 2004/0124623 A1 | | 7/2004 | Yamazaki |
| 2005/0194773 A1 | * | 9/2005 | Yamada et al. ............. 280/752 |
| 2006/0131861 A1 | | 6/2006 | Mani |

FOREIGN PATENT DOCUMENTS

JP        63-315347        12/1988

* cited by examiner

Primary Examiner—Eric Culbreth
(74) Attorney, Agent, or Firm—Mark E. Duell; Fay Sharpe LLP (57) ABSTRACT

A vehicle knee bolster assembly including a cross member extending laterally across a vehicle and a knee bolster including a frame having a closed cross sectional configuration with a hollow interior. The knee bolster further has a plurality of partition walls dividing the interior of the frame so as to form, together with the frame, a plurality of inner frames each having a closed cross sectional configuration and a hollow interior. The plurality of inner frames define at least two crush zones that collapse sequentially as the knee bolster is forcibly deflected.

21 Claims, 4 Drawing Sheets

KNEE BOLSTER

BACKGROUND

The present disclosure relates, in general, to knee bolsters used in vehicles to protect the knees of vehicle occupants, such as during the event of a collision or crash. More particularly, the disclosure relates to an improved knee bolster that is easier to manufacture, assemble in a vehicle and/or provides an improved stepped crush (i.e., controlled deflection) when forcibly impacted. In one embodiment, the improved knee bolster employs varied shapes, thicknesses and/or dimensions to create multiple (e.g., two) crush zones for providing a multiple-step deflection versus force curve, i.e., a particular stepped crush, wherein the crush zones collapse sequentially when a sufficient force is applied to the knee bolster, such as a knee impacting the knee bolster during a collision. The improved knee bolster will be described with particular reference to this and like embodiments, but it is to be appreciated that it is also amenable to other like applications.

In general, it is well known to use a knee bolster on or adjacent a vehicle's front dashboard, such as on either side of the vehicle's steering column extending from the front dashboard. Examples of such an arrangement are provided in U.S. Pat. No. 5,037,130 to Okuyama and U.S. Pat. No. 5,370,417 to Kelman et al., both expressly incorporated herein by reference. Another knee bolster example is disclosed in commonly-owned U.S. Pat. No. 4,893,834, also expressly incorporated herein by reference.

It is also known to attempt to control the crush (i.e., deflection relative to impact force) of a knee bolster. Various types of knee bolsters have been proposed for this purpose. Examples of such knee bolsters are disclosed in U.S. Pat. No. 5,273,314 to Sakakibara; U.S. Pat. No. 5,549,327 to Rüsche et al.; and U.S. Pat. No. 6,609,727 to Figlioli et al., all expressly incorporated herein by reference. The '314 and '727 patents disclose step-shaped knee bolsters, whereas the '327 patent discloses a knee bolster having a wall with a progressively dimensioned thickness for purposes of controlling the rate of crush.

However, these and other prior art knee bolsters are not always suitable for and/or do not necessarily fit properly within particular vehicle layouts. Further, many conventional knee bolsters are bolt-on structures and not typically formed of a material that lends itself to being welded to a vehicle frame or body, such as when the frame or body is formed of aluminum. In view of the foregoing, there is a need for a knee bolster which can be fit into specific vehicle layout configurations. Moreover, there is a need for a knee bolster that can be formed of a preferred material, such as aluminum for example, that allows for a welded connection to an underlying vehicle structure, such as an aluminum vehicle frame.

There also always remains a need for knee bolster exhibiting improved crush or deformation characteristics. In particular, an optimally designed knee bolster will allow a specified force to pass through the knee bolster to a vehicle occupant's femur bone during a collision, the specified force being a threshold force that is considered the highest reasonable force able to be absorbed by a vehicle occupant's femur bone without breaking or fracturing the same. Allowing the femur bone of a vehicle occupant to absorb the highest reasonable force possible without breaking or fracturing has the effect of reducing as much as possible the amount of force imparted on the occupant's chest or other body portions during a collision. In the case where the vehicle occupant is the driver, allowing the driver's femur bone to receive the maximum possible reasonable force without breaking or fracturing directly reduces the amount of force imparted to the driver's chest from the steering column during a collision.

Other considerations supporting the need for an improved knee bolster include the overly complex construction of prior art knee bolsters which often requires complicated and/or costly processes for making the components that ultimately form the knee bolster. In addition, prior art knee bolsters often require difficult assembly procedures for assembly and/or installation into a vehicle. Still further, prior art knee bolsters are often difficult to modify for purposes of adjusting responsiveness to impact loads applied thereagainst.

SUMMARY

In accordance with one aspect, a new and improved knee bolster employs segments of varied shapes, thicknesses and/or dimensions to form multiple crush zones for providing a stepped deflection versus force curve, i.e., a particular stepped crush curve. The crush zones can function or collapse sequentially when a sufficient force is applied to the knee bolster, such as a knee impacting the knee bolster during a collision, to exhibit optimal deflection versus force behavior.

In accordance with another aspect, a vehicle knee bolster assembly is provided. More particularly, in accordance with this aspect, the knee bolster assembly includes a cross member and a knee bolster. The cross member extends laterally across a vehicle. The knee bolster includes a frame having a closed cross sectional configuration with a hollow interior and further having a plurality of partition walls which divide the interior of the frame so as to form, together with the frame, a plurality of inner frames each having a closed cross sectional configuration and a hollow interior. The plurality of inner frames define at least two crush zones that collapse sequentially as the knee bolster is forcibly deflected.

In accordance with yet another aspect, a knee bolster is provided for mounting within a vehicle. More particularly, in accordance with this aspect, the knee bolster includes a plurality of adjoining hollow profile sections including a mounting section mounted to an associated cross beam of the vehicle. The hollow profile sections define at least two crush zones that collapse sequentially upon deformation by an impacting force to thereby exhibit two-step deformation versus force performance.

In accordance with still yet another aspect, a knee bolster assembly is provided for mounting within a vehicle. More particularly, in accordance with this aspect, the knee bolster assembly includes a cross member extending laterally across a vehicle and a knee bolster. The knee bolster includes a plurality of sections that together form at least two crush zones that collapse sequentially as the knee bolster is forcibly deflected. The plurality of sections includes a first section, a second section and a third section. A first of the at least two crush zones is formed by the first and second sections and a second of the at least two crush zones is formed by the second and third sections.

The first section has a contact segment adapted to first receive forces transmitted from an impacting knee of a vehicle occupant, rounded segments extending from ends of the contact segment and angled segments extending from the rounded segments to the contact segment at a location disposed between the ends of the contact segment. The second section has hooked segments extending from the rounded segments and connected to one another by a bridge segment. The third section has a V-shaped segment and a pair of support segments. The V-shaped segment has ends opposite an apex that connect to the hooked segments between respective ends of the hooked segments. The pair of support segments respectively extend from transition portions of the V-shaped segment to a base segment to which the apex is connected.

DETAILED DESCRIPTION

Figure 1:
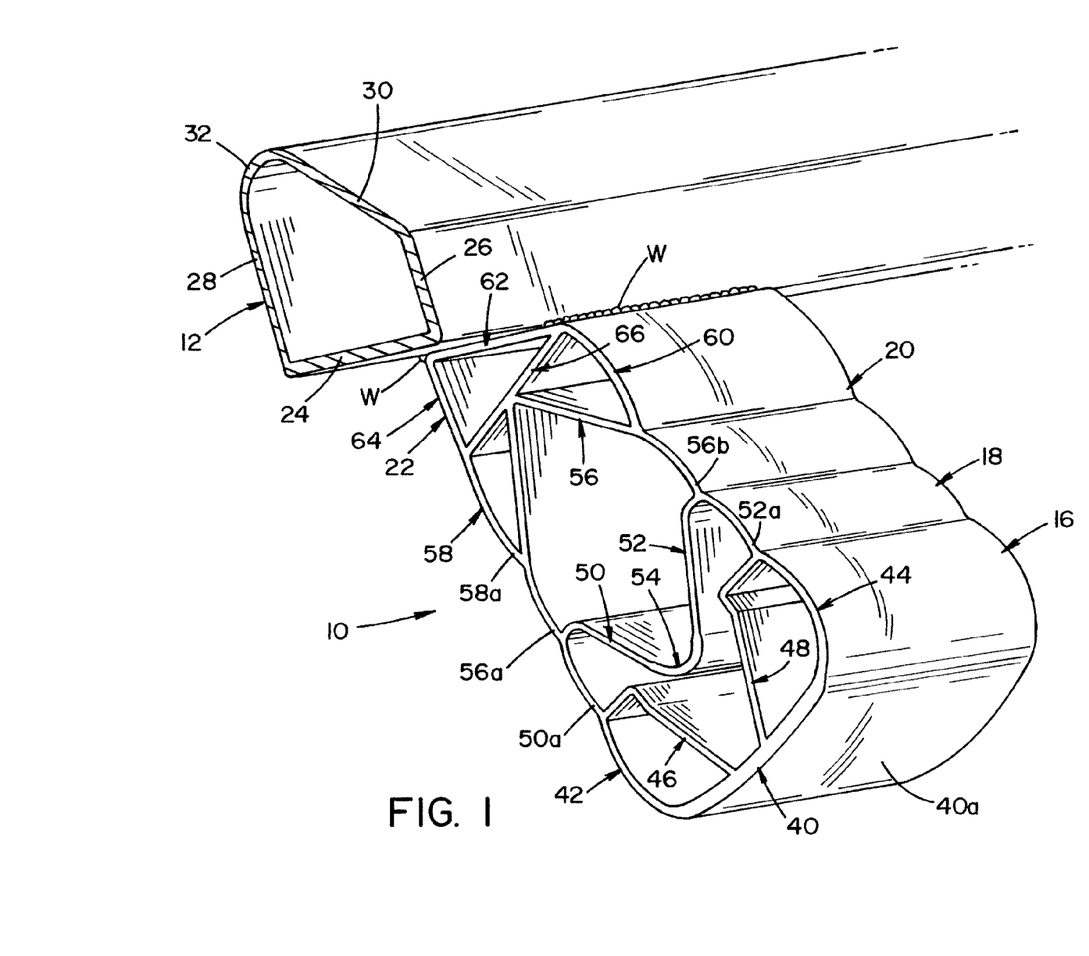
FIG. 1 is a perspective view of a knee bolster mounted to a cross beam of a vehicle.

Referring now to the drawings wherein the showings are for purposes of illustrating one or more exemplary embodiments, a knee bolster for mounting within a vehicle is depicted in FIG. 1 and generally indicated by reference numeral 10. As is known and understood by those skilled in the art, the knee bolster 10 is secured to a cross beam or member 12 of a vehicle and oriented such that the knee bolster can extend toward a passenger compartment of the vehicle so as to protect a vehicle occupant's knee or knees in the event that the occupant's knee or knees are forcibly moved into the area of the vehicle occupied by the knee bolster, such as can occur during or resulting from a vehicle collision. In one embodiment, the knee bolster 10 can be secured to the cross beam 12 by welding, but alternatively the knee bolster can be secured to the cross beam by any other known means or connection type.

Figure 2:
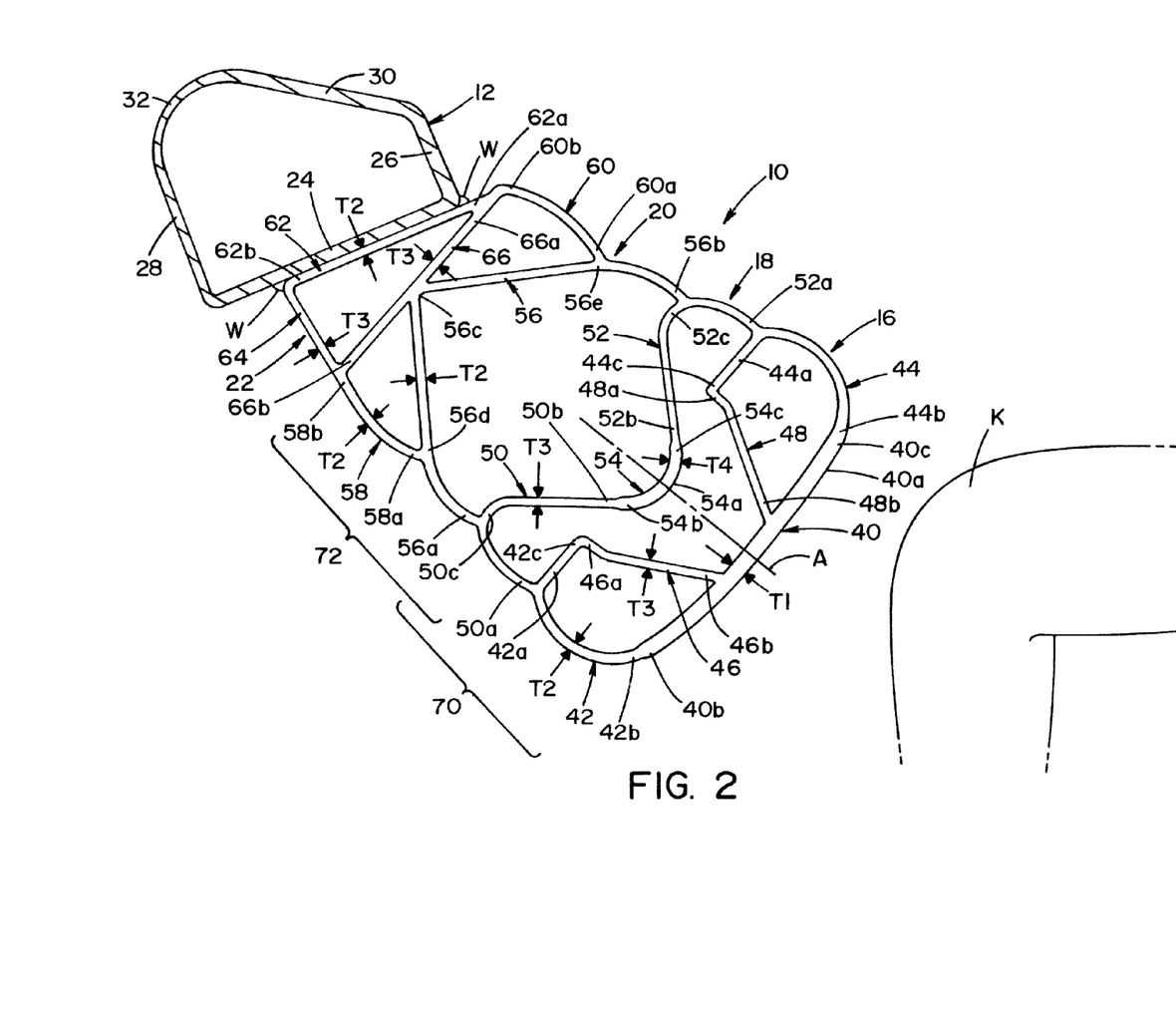
FIG. 2 is a cross-sectional view of the knee bolster of FIG. 1 showing a vehicle occupant's knee in spaced and opposed relation to the knee bolster.

With reference to FIGS. 1 and 2, in the illustrated embodiment, the knee bolster 10 extends from the cross member 12 into the vehicle's passenger compartment generally along an axis A. The cross member 12 extends laterally across the vehicle and can be part of or connected to the vehicle's frame. Together the cross member 12 and the knee bolster 10 form a vehicle knee bolster assembly. As shown, the knee bolster 10 of the knee bolster assembly includes a frame having a closed cross sectional configuration with a hollow interior and further having a plurality of partition walls which divide the interior of the frame so as to form, together with the frame, a plurality of inner frames each having a closed cross sectional configuration and a hollow interior. The frame and the partition walls, and thus the illustrated knee bolster 10, include or can be divided generally into four (4) sections (alternately referred to herein as adjoining hollow profile sections), including a first profile section 16, a second profile section 18, a third profile section 20 and a fourth profile section 22. The first profile section 16 includes a pair of the plurality of inner frames and is mounted at a location spaced from the cross beam 12. The fourth section 22 includes one of the plurality of inner frames and is directly mounted to (i.e., immediately adjacent) the cross beam 12. The second and third sections 18,20, which include and/or form with the other section more of the plurality of inner frames, are disposed between and connect the first and fourth sections 16,22.

All of the inner frames and thus the sections 16-22 have profiles (i.e., cross-sections) that enable the inner frames and sections, and thereby the entire knee bolster 10, to be extrudable. When formed by extruding, the inner frames and the sections 16-22 can be formed of extruded aluminum or any other extrudable material. In one embodiment, the sections 16-22 and thus the knee bolster itself are formed as a unitary or integral structure that can be extruded as a single component thereby removing the need to weld together or otherwise assemble any parts (e.g., the sections 16-22) to form the knee bolster. Of course, when extruded the knee bolster 10 may be cut along a plane parallel to the illustrated cross section to provide the knee bolster with a desired width, including the width shown in FIG. 1. With an adjustable width and a relatively compact cross section, particularly relative to the force required for crush or deformation, the knee bolster 10 is readily able to fit into a variety of vehicle layouts not well adapted or suitable for many of the prior art knee bolsters.

The first section 16 of the illustrated embodiment is positioned longitudinally along the axis A distally relative to the cross member 12 so as to be adapted to first engage (relative to the other sections 18-22) a vehicle occupant's knee K in a collision which causes the knee to be thrust forward toward or into the knee bolster 10. The intermediate, second section 18 is provided along the axis A adjacent the first section 16 on a side thereof in the direction of the cross member 12 and likewise the third, intermediate section 20 is provided along the axis A. In particular, the third section 20 is adjacent the second section 18 on a side thereof in the direction of the cross member 12, and also adjacent the fourth section 22. Adjacent the third section 20 is the fourth section 22 that is secured to the cross member 12 via welds W. The sections 18-22 position the first section, which forms a knee panel member, at a location spaced apart and opposed by one or both knees K of the vehicle occupant, as shown in FIG. 2. As will be described in more detail below, each of the knee bolster sections 16,18, 20,22 is formed of a plurality of segments which can have varying thicknesses to provide a desired crush effect when the knee K is forcibly moved into the knee bolster 10.

In the illustrated embodiment, the cross beam 12 is a hollow beam formed by walls 24,26,28,30. The knee bolster 10, specifically the fourth section 22 of the knee bolster, is mounted to the mounting wall 24 of the cross beam 12. In the illustrated embodiment, the walls 26,28 extend from the mounting wall 24 in a direction approximately normal relative to the mounting wall. The walls 26,28 are generally parallel and spaced apart relative to one another, though wall 26 can be shorter in length than wall 28. Wall 30 connects the walls 26,28 together. Wall 30 is spaced apart from and angularly disposed relative to the mounting wall 24. A curved wall section 32 connects wall 28 and wall 30. Of course, as will be understood and appreciated by those skilled in the art, the cross beam 12 need not be configured as shown and described herein and the fourth section 22 of the knee bolster could be modified for secure attachment to other types and shapes of cross beams.

The first section 16 of the illustrated knee bolster 10 includes a contact or knee panel segment 40 which extends transversely relative to the axis A on both sides thereof and is adapted to first receive forces transmitted from the impacting knee K of the vehicle occupant. The knee panel segment 40 includes a surface 40a for engaging the knee K that is generally planar and/or has a slight curve or bow thereacross (i.e., being slightly convex relative to the knee K). The knee panel segment 40 has a first thickness T1 that, in the illustrated embodiment, is about 5.0 mm. Flanking ends 40b,40c of the knee panel segment 40 are rounded or spacing segments 42,44, alternatively referred to herein as outer support legs. Each of the rounded segments 42,44 extends respectively from ends 40b,40c of the knee panel segment 40, initially further away from the axis A, then curving away from the knee panel segment 24 in a direction parallel to the axis A, and ultimately curling back toward the axis A at a location spaced from the knee panel segment 24 thereby defining portions 42a,44a that are generally parallel relative to the knee panel segment 40. The rounded segments 42,44 have a second thickness T2 that can be less than the first thickness T1 of the knee panel segment 24. In the illustrated embodiment, the second thickness T2 is about 2.0 mm.

First ends 42b,44b of the rounded segments 42,44 are adjacent the ends 40b,40c of the knee panel segment 40 and second ends 42c,44c are positioned in spaced relation relative to the first ends 42b,44b and the axis A in a direction toward the cross member 12. Extending from the second ends 42c, 44c of the rounded segments 42,44 are a pair of angled segments 46,48 which extend back toward and to the contact segment 40. Specifically, the angled segments 46,48 are angularly disposed relative to the axis A and relative to the rounded segment portions adjacent ends 42c,44c and the knee panel segment 40. From first ends 46a,48a, the angled segments 46,48 extend toward both the knee panel segment 40 and toward the axis A. Second ends 46b,48b of the angled segments are adjacent and in contact with the knee panel segment 40 at locations spaced apart from one another and between the axis A and respective adjacent knee panel segment ends 40b,40c. The angled segments each have a third thickness T3. The third thickness T3 can be greater than the second thickness T2 and less than the first thickness T1. In the illustrated embodiment, the third thickness T3 is about 2.5 mm.

Also, in the illustrated embodiment, the second section 18 has an "M" or double-wing shape. The M-shaped section 18 includes a pair of hooked segments 50,52 and a center segment 54 connecting the hooked segments 50,52 together. The hooked segments 50,52 have respective first ends 50a,52a connected to or positioned adjacent the rounded segments 42,44 of the first section 16, and more particularly adjacent the rounded segment portions 42a,44a at locations distally spaced along the portions 42a,44a relative to the rounded segment second ends 42c,44c. The hooked segments 50,52 extend from the rounded segments 42,44 in the direction of the axis A toward the cross member 12, then curve back in toward the axis A and then extend toward the knee panel segment 40. Second ends 50b,52b of the hooked segments are spaced apart from one another and are generally positioned between the angled segments first ends 46a,48a. The hooked segments 50,52 have the same third thickness T3, 2.5 mm in the illustrated embodiment, as the angled segments 46,48 of the first profile section 16.

The center segment 54 bridges between the hooked segments 50,52, and specifically the hooked segment ends 50b, 52b. The center segment 54 is generally curved convexly toward the knee bolster segment 40 and defines an apex 54a at about the axis A. Opposite ends 54b,54c of the center segment 54 are connected to and/or positioned adjacent the hooked segment ends 50a,52b. The center segment 54 can have a fourth thickness T4 that is generally greater than the third thickness T3. In the illustrated embodiment, the fourth thickness T4 is about 3.5 mm.

The third section 20 includes a generally V-shaped segment 56 flanked by a pair of support segments 58,60. Ends 56a,56b of the segment 56 connect to and/or are adjacent the second section 18 at the hooked segments 50,52. More specifically, the ends 56a,56b are disposed on or against raised portions 50c,52c of the hooked segments 50,52, which are themselves disposed between the hooked segment ends (ends 50a,50b on the first hooked segment 50 and ends 52a,52b on the second hooked segment). A closed end or apex 56c of the V-shaped segment 56 connects to the mounting section 22 at the axis A.

The support segments 58,60 extend from the V-shaped segment at respective locations between the ends 56a,56b and the apex 56c and extend to the mounting section 22, connecting therewith at locations spaced apart from and flanking the axis A. More specifically, first ends 58a,60a of the support segments 58,60 are positioned adjacent and/or are connected to transition portions 56d,56e of the V-shaped segment 56. As shown, each side of the V-shaped segment 56 extends from the second section 18 generally toward the cross member 12 and in alignment (i.e., parallel or almost parallel) to the axis A and then each respective one of the transition portions 56d, 56e redirects the V-shaped segment toward the apex 56c located at the axis A.

The support segment 58 is spaced apart from and generally extends in alignment with (i.e., parallel or almost parallel) the axis A and terminates at second end 58b located at or adjacent the mounting section 22. The support segment 60 is also spaced apart from and generally extends in alignment with (i.e., parallel or almost parallel) the axis A and terminates at second end location 60b located at or adjacent the mounting section 22. All of the segments comprising the third section 20 (i.e., segments 56,58,60) can have the same second thickness T2, which is about 2.0 mm in the illustrated embodiment.

The fourth or mounting section 22 is generally triangular shaped (i.e., formed as a hollow prism) and is comprised of segments 62,64 and 66. Segment 62, also referred to herein as a mounting segment, is positioned in abutting relation with the cross member 12 and, as shown, is welded to the cross member by welds W. As shown, the mounting segment 62 can extend along a significant portion of the longitudinal length of the wall 24 of the cross beam 12. First end 62a of the mounting segment 62 terminates at or adjacent end 60b of segment 60 and second end 62b terminates along the wall 24. The segment 66 extends between the second ends 58b,60b of the segments 58,60 and also connects to the apex 56c of the third section 20. More particularly, first end 66a terminates with ends 60b and 62a and second end 66b terminates at or adjacent end 58b of segment 58. Segment 64 extends between ends 62b and 66b. The segments 64,66 can be formed with the same third thickness T3 (2.5 mm in the illustrated embodiment) and the mounting segment 62 can be formed with the same second thickness T2 (2.0 mm in the illustrated embodiment).

Though the thicknesses T1-T4 are shown as rather abruptly transitioning into one another in the illustrated embodiment, those skilled in the art are to appreciate that the segments of the knee bolster 10 can more gradually blend into one another (i.e., transition more gradually) if so desired. When the knee bolster 10 is formed by extrusion, the transitions between the segments forming the knee bolster can be more abrupt (like the illustrated knee bolster 10, for example) or can be much more gradual or smooth. The performance of the knee bolster 10, which will be described in further detail below, does not vary much regardless of the type of transition (e.g., abrupt or gradual) used between the knee bolster's segments.

To install the knee bolster 10 in a vehicle, the mounting segment 62 of the mounting section 22 is secured to the cross member 12. For example, the mounting segment 62 can be welded, such as by welds W, particularly when the knee bolster 10 is formed of a material conducive to being welded to cross member. For example, when the cross member 12 is formed of aluminum, the knee bolster 10 can be formed of aluminum to facilitate welding of the knee bolster to the cross member 12. Of course, the knee bolster 10 and/or the cross member 12 can be formed of other materials and can be secured to one another through other means or methods. In one contemplated application, the knee bolster 10 can be used as one of a pair of knee bolsters flanking the steering column of the vehicle. Of course, however, other configurations and numbers (i.e., one or more than a pair) of knee bolsters can be employed in any specific vehicle application. In any case, as is known and understood by those skilled in the art, the knee bolster 10 can be provided beneath a plastic cover or garnish so that the knee bolster is hidden from passengers in the vehicle to provide a more aesthetically pleasing appearance.

The illustrated knee bolster 10 is specifically tuned to provide a vehicle occupant with an optimal force along the occupants femur bone when the vehicle occupant is thrust forward into the knee bolster, such as during a vehicle collision. The optimal force can be the highest amount of force reasonably able to be absorbed by the femur bone without breaking the same. Stated alternatively, the illustrated knee bolster allows a specified force to pass through the knee bolster to the vehicle occupant's femur bone during a collision, where the specified force is a threshold force that is determined as representing the highest force reasonably able to be absorbed by a vehicle occupant's femur bone without that bone breaking. It has been found that allowing the femur bone of a vehicle occupant to absorb the highest reasonable force possible without breaking or fracturing has the effect of reducing as much as possible or at least to a significant extent the amount of force imparted on the occupant's chest or other body portions during a collision. In the case where the vehicle occupant is the driver, allowing the driver's femur bone to receive the maximum reasonable possible force without breaking or fracturing directly reduces the amount of force imparted to the driver's chest from the steering column during a collision.

For providing the specified or threshold force, which preferably compensates for vehicle occupants of varying sizes, the knee bolster 10 includes multiple crush zones (i.e., at least two crush zones), which are formed or defined by the plurality of inner frames, for collapsing sequentially as the knee bolster is forcibly deflected. More particularly, in the illustrated embodiment, the first and second sections 16,18 of the knee bolster 10 together form or define a first crush zone 70 and the second and third sections 18,20 together form or define a second crush zone 72. As already described, the sections 16-22, and thus the inner frames, include segments having varying thicknesses to enable the knee bolster to define the crush zones 70,72. As will be described in further detail below, the crush zones 70,72 enable the knee bolster 10 of the illustrated embodiment to exhibit two-step displacement (or deflection) versus force behavior. With additional reference to FIG. 3, when an impact force F is applied against the knee bolster 10 of the illustrated embodiment, such as from knee K being forcibly driven into the knee bolster during a vehicle collision, the knee bolster deforms or collapses as shown. In particular, the first and second crush zones 70,72 collapse sequentially, i.e., the first crush zone 70 collapses and then subsequently the second crush zone 72 collapses.

Figure 4:
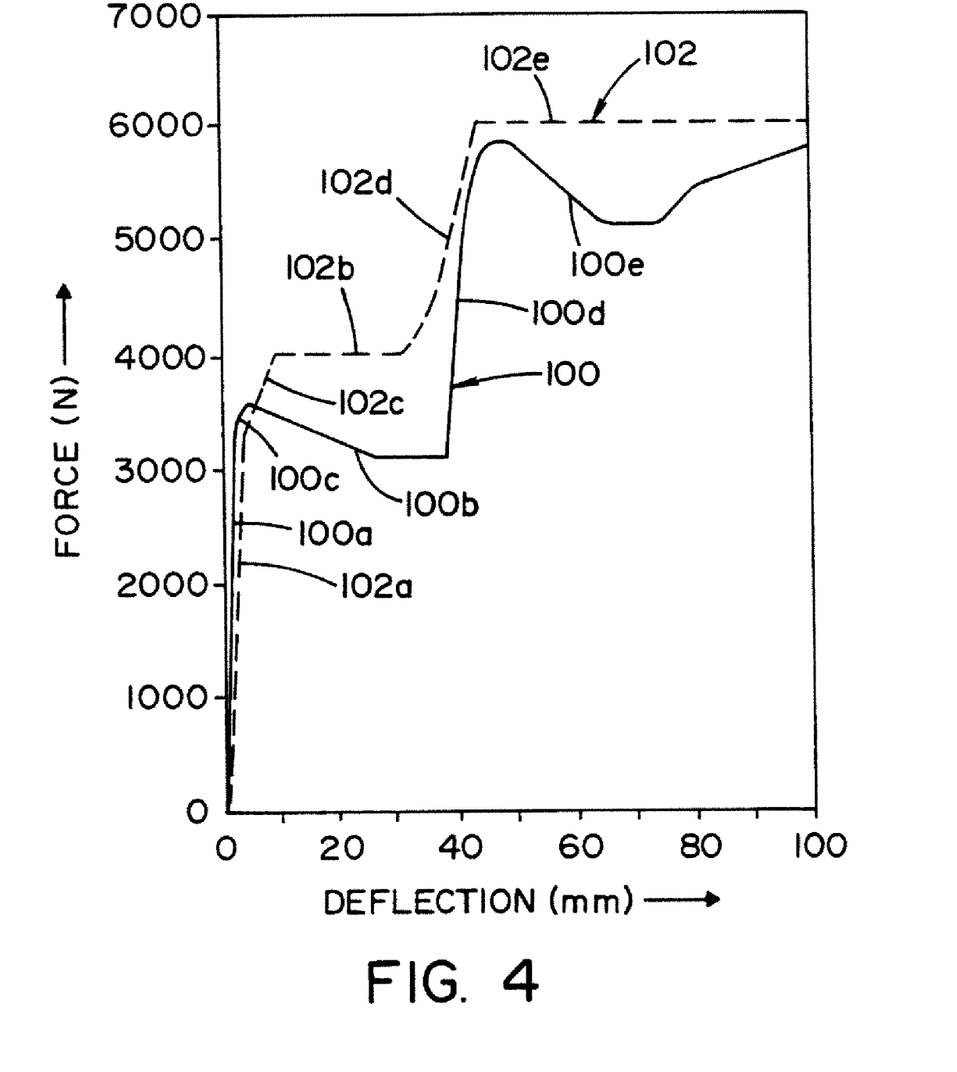
FIG. 4 is a deflection versus force graph showing the relative displacement or deflection of the knee bolster of FIG. 1 and the force provided by the knee bolster as compared to a target curve.

With still additional reference to FIG. 4, the knee bolster 10 of the illustrated embodiment is designed to have a deflection versus force curve 100 that matches or at least generally follows a target displacement/deflection versus force curve, such as the illustrated target curve 102. The target crush curve 102 represents one ideal displacement versus force curve showing the amount of force provided by a knee bolster in relation to the amount of deflection seen by the knee bolster. Stated alternatively, the target crush curve 102 represents the ideal amount of force supplied by a knee bolster as a knee is moves thereinto and deflects the knee bolster.

As indicated, a knee bolster exhibiting the behavior of the ideal deflection versus force curve 102 will initially deflect very little (e.g., about 5 mm to about 10 mm), represented by curve portion 102a, and thus nearly returns an equal and opposite force to an impacting knee until the deflection of the knee bolster exceeds about 10 mm at which point the force will be at about 4,000 N. At this point, the knee bolster will ideally crush to some degree and absorb some or all of the energy imparted thereto from the impacting knee. As shown, in the ideal curve 102, the knee bolster will crush and deflect a first significant amount, such as about an additional 20-25 mm, represented by curve portion 102b. Preferably, there would be a transition curve portion 102c between portions 102a and 102b so as to lessen the abruptness of the knee bolster crushing.

Significant further deflection of the knee bolster results in a ramping up of the force provided thereby, as represented by curve portion 102d. Thus, when the knee bolster following the curve 102 is deflected beyond about 30 mm, the knee bolster again begins to return a force to the knee deflecting it, but simultaneously continues to deflect slightly (e.g., about another 10 mm), which is shown by the slight slope of the curve portion 102d. When the deflection exceeds about 40 mm, which is at about 6,0000 N, the knee bolster again crushes to further absorb energy imparted thereto from the impacting knee. In other words, when the force applied to the knee bolster reaches or exceeds about 6,000 N, the knee bolster preferably deflects a second significant amount, such as to an amount greater than 50 mm, as represented by curve portion 102e.

The two-step deflection versus force curve 102 can be used to slow the impact of a passenger and better position the passenger, particularly if not safely belted in the vehicle, prior to deployment of the vehicle's airbag system and/or impact into the steering wheel. Slowing the impact of the passenger as exemplified by the ideal deformation curve 102 may be desirable, particularly when the impact force is less than a specified load, such as about 6,000 N (the highest force of the illustrated target curve 102). The two-step target crush curve 102 is ideal because it protects vehicle occupants of varying sizes. It is expected that a larger vehicle occupant will generally move further forward in a vehicle than a smaller vehicle occupant in the event of a vehicle collision (e.g., a front end collision). The longer the movement of the vehicle occupant, the greater the force that is required to compress the knee bolster. Further, the femur of a larger vehicle occupant (or a typical male passenger, for example) is able to withstand more loading than the femur of a smaller vehicle occupant (or a typical female passenger, for example) without any breakage.

It is generally expected that a smaller passenger (such as an average size female vehicle occupant) will stroke the knee bolster to a predictable value (e.g., 30 mm). Accordingly, the ideal curve 102 allows for a relatively low force (i.e., less than 4,000 N) to be provided by the knee bolster when accommodating such a deflection. After the knee bolster has collapsed beyond the predictable value, the force provided by the knee bolster begins to increase to begin protection of a larger passenger (such as an average size male vehicle occupant). Thus, the two tier or plateau shape of the curve 102 enables a constant force to be applied to the knee at various points during a collision, the constant force generally being the maximum reasonable force possible that does not result in breakage of the vehicle occupant's femur bone regardless of whether the vehicle occupant is a smaller vehicle occupant or a larger occupant.

Figure 3:
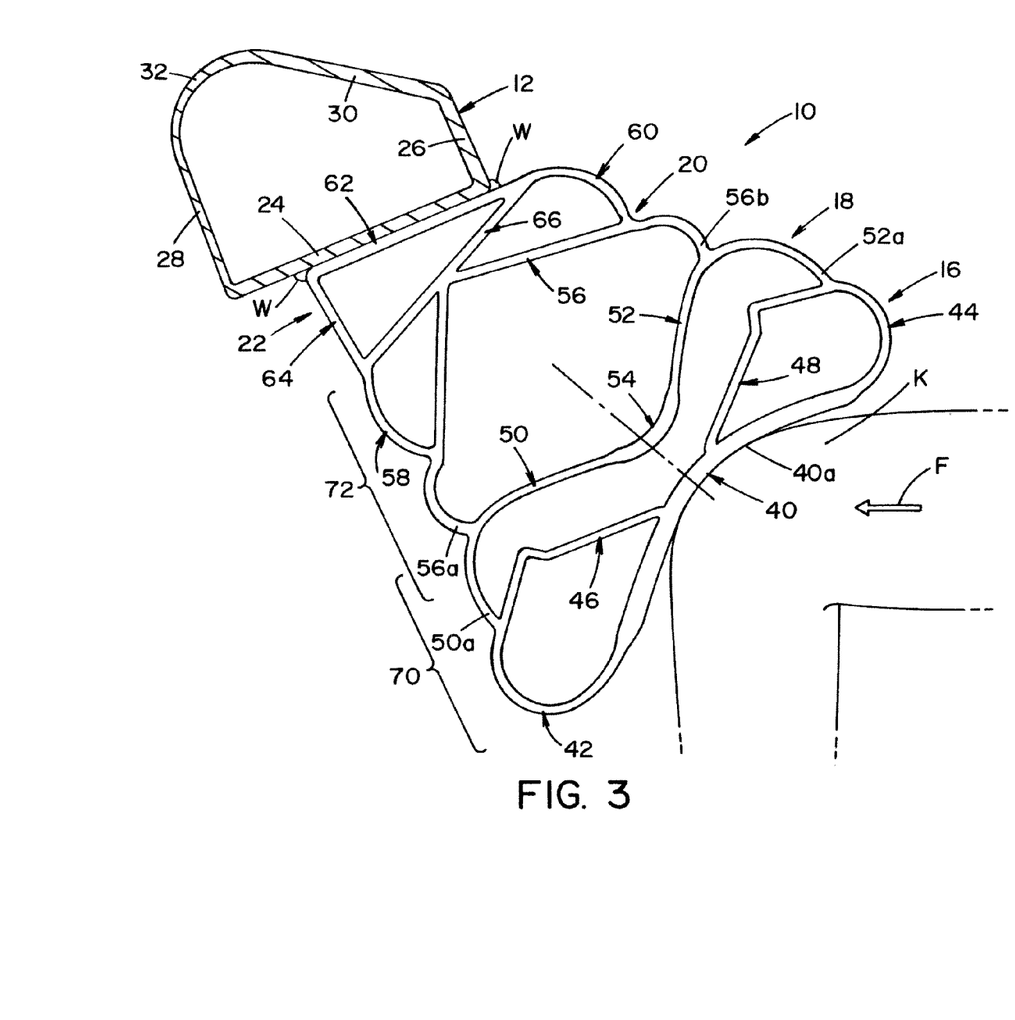
FIG. 3 is a cross-sectional view of the knee bolster of FIG. 2 showing the knee impacting into and deflecting the knee bolster.

The knee bolster 10 shown and described herein can have dimensions, such as those indicated in association with the illustrated embodiment, that cause the knee bolster to exhibit the deflection versus force behavior of curve 100, which generally follows the target curve 102. The positioning, nominal sizing and/or relative sizing of the segments of the illustrated knee bolster 10 enable it to exhibit the deflection versus force behavior of the curve 100. More particularly, the knee bolster 10 will return (i.e., provides) a force up to about 3,500 N to an impacting knee as it deflects from about 0 mm to about 5 mm, as represented by curve portion 100a. Thereafter, when the knee bolster 10 is deflected more than about 5 mm, the knee bolster 10 will crush to absorb energy imparted thereto from the impacting knee until the knee bolster has deflected to about 40 mm, as represented by curve portion 100b, and can be referred to as a first significant amount of deflection of the knee bolster 10. When crushing during deflection beyond an amount greater than about 15 mm and up to about 40 mm, specifically the first crush zone 70 collapses as shown in FIG. 3. As shown, the segment 40 bows inward (i.e., concave relative to the knee K) and the segments 42,44 bow outward. Likewise, the segments 50,52 generally bow outward adjacent segment ends 50a,52a. Notably, the knee bolster 10 can exhibit the same transition behavior, as represented by curve portion 100c, as considered desirable in the ideal curve at 102c.

After the first crush zone 70 collapses, the knee bolster 10 resists further deflection beyond 40 mm and begins to return a force to the impacting knee up to just below about 6,000 N, as represented by curve portion 100d. When the force reaches an amount sufficient enough to further deflect the knee bolster 10 beyond an amount greater than about 40 mm, the second crush zone 72 collapses as shown in FIG. 3 and the knee bolster deflects a second substantial amount, as represented by curve portion 100e. When the second crush zone 72 collapses, the segment 56 spreads apart with ends 56a,56b bowing outward and the segments 58,60 each bow outward. Thus, the deflection curve 100 of the knee bolster 10 generally follows the two-step path of target curve 102, including sequentially collapsing first at or slightly below 4,000 N (e.g., at 3,500 N) and then at or slightly below 6,000 N, and provides the advantages of two-step deflection versus force knee bolster behavior discussed in association with the target curve 102.

Of course, as should be understood and appreciated by those skilled in the art, positioning, nominal thicknesses (e.g., T1, T2, T3 or T4) and/or relative widths of any of the segments can vary and may be tuned dependent upon the desired deflection versus force behavior desired for a particular knee bolster. Additionally, it will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle knee bolster assembly, comprising:
a cross member extending laterally across a vehicle; and a knee bolster including a frame secured to said cross member, said frame having a closed cross sectional configuration with a hollow interior and further having a plurality of partition walls which divide said interior of said frame so as to form, together with said frame, a plurality of inner frames each having a closed cross sectional configuration and a hollow interior, said plurality of inner frames defining at least two crush zones spaced apart from said cross member that collapse sequentially as said knee bolster is forcibly deflected, each of said at least two crush zones formed by at least one of said plurality of inner frames having said hollow interior and said closed cross sectional configuration, and wherein a first crush zone of said at least two crush zones is formed by a first section having a contact segment adapted to first receive forces transmitted from an associated impacting knee of a vehicle occupant, said first section further including rounded segments extending from ends thereof and angled segments extending from said rounded segments to said contact segment at a location disposed between said ends of said contact segment, said first crush zone further formed by a second section having hooked segments extending from said rounded segments and connected to one another by a bridge segment.

2. The vehicle knee bolster assembly of claim 1 wherein a first crush zone of said at least two crush zones collapses when said knee bolster deflects an amount greater than about 5 mm.

3. The vehicle knee bolster of claim 2 wherein a second crush zone of said at least two crush zones collapses when said knee bolster deflects an amount greater than about 40 mm.

4. The vehicle knee bolster assembly of claim 1 wherein said knee bolster provides a reacting force of up to about 3,500 N until deflected more than about 5 mm which causes a first of said at least two crush zones to collapse.

5. The vehicle knee bolster assembly of claim 4 wherein, after the collapse of said first of said at least two crush zones, said knee bolster provides a reacting force of up to about 6,000 N until deflected more than about 40 mm which causes a second of said at least two crush zones to collapse.

6. The vehicle knee bolster assembly of claim 1 wherein said at least two crush zones collapsing sequentially causes said knee bolster to exhibit two-step deflection versus force performance.

7. The vehicle knee bolster assembly of claim 6 wherein said knee bolster provides a reacting force to an impacting knee of up to about 3,500 N until a first of said at least two crush zones collapses when said knee bolster is deflected more than about 5 mm and then said knee bolster provides a reacting force to the impacting knee of up to about 6,000 N until a second of said at least two crush zones collapses when said knee bolster is deflected more than about 40 mm.

8. The vehicle knee bolster assembly of claim 1 wherein said inner frames include segments having varying thicknesses to enable said knee bolster to define said at least two crush zones that collapse sequentially as the knee bolster is forcibly deflected.

9. The vehicle knee bolster assembly of claim 8 wherein said varying thicknesses include at least four segments each of varying thicknesses.

10. The vehicle knee bolster assembly of claim 1 wherein said knee bolster is formed of extruded aluminum.

11. The vehicle knee bolster assembly of claim 10 wherein said knee bolster of extruded aluminum is welded to said cross member which is also formed of aluminum.

12. The vehicle knee bolster assembly of claim 1 wherein said contact segment has a thickness T1, said rounded segments each have a thickness T2, and said 1angled segments each have a thickness T3, said hooked segments also each have a thickness of T3 and said bridge segment has a thickness T4, wherein T3 is greater than T2, T4 is greater than T3 and T1 is greater than T3.

13. The vehicle knee bolster assembly of claim 12 wherein T1 is about 5 mm, T2 is about 2 mm, T3 is about 2.5 mm and T4 is about 3.5 mm.

14. The vehicle knee bolster assembly of claim 1 wherein a second crush zone of said at least two crush zones is formed by a second section having hooked segments and connected to one another by a bridge segment, said second crush zone further formed by a third section having a V-shaped segment, said V-shaped segment having ends opposite an apex that connect to said hooked segments between respective ends of said hooked segments.

15. The vehicle knee bolster assembly of claim 14 wherein said second crush zone is further formed by support segments extending from transition portions of said V-shaped segment to a base segment to which said apex is connected.

16. The vehicle knee bolster assembly of claim 15 wherein said hooked segments and said base segment have a thickness T3, said bridge segment has a thickness T4, said V-shaped segment and said support segments have a thickness T2 that is less than T3, T3 being less than T4.

17. The vehicle knee bolster assembly of claim 1 wherein said a second crush zone of said at least two crush zones is formed by said second section having hooked segments and connected to one another by said bridge segment, said second crush zone further formed by a third section having a V-shaped segment, said V-shaped segment having ends opposite an apex that connect to said hooked segments between respective ends of said hooked segments.

18. The vehicle knee bolster assembly of claim 17 wherein the first crush zone is distally disposed relative to the cross member and the second crush zone is proximally disposed relative to the cross member.

19. A knee bolster for mounting within a vehicle, said knee bolster comprising:
a plurality of adjoining closed hollow profile sections including a mounting section mounted to an associated cross beam of the vehicle, at least two of said hollow profile sections forwardly disposed relative to said mounting section and defining at least two crush zones that collapse sequentially upon deformation by an impacting force to thereby exhibit two-step deformation versus force performance, and wherein a first crush zone of said at least two crush zones is formed by a first section having a contact segment adapted to first receive forces transmitted from an associated impacting knee of a vehicle occupant, said first section further including rounded segments extending from ends thereof and angled segments extending from said rounded segments to said contact segment at a location disposed between said ends of said contact segment, said first crush zone further formed by a second section having hooked segments extending from said rounded segments and connected to one another by a bridge segment.

20. The knee bolster of claim 19 wherein said plurality of adjoining hollow profile sections provides a force of up to about 3,500 N and a first of said at least two crush zones collapses only after deformation of more than about 5 mm and then said plurality of adjoining hollow profile sections provides a force of up to about 6,000 N and a second of said at least two crush zones collapses only after deformation of more than about 40 mm.

21. A knee bolster assembly for mounting within a vehicle, said knee bolster comprising:
a cross member extending laterally across a vehicle; and
a knee bolster comprising a plurality of sections that together form at least two crush zones that collapse sequentially as said knee bolster is forcibly deflected;
wherein said plurality of sections includes a first section having a contact segment adapted to first receive forces transmitted from an impacting knee of a vehicle occupant, rounded segments extending from ends of said contact segment and angled segments extending from said rounded segments to said contact segment at a location disposed between said ends of said contact segment, said plurality of sections further including a second section having hooked segments extending from said rounded segments and connected to one another by a bridge segment,
said plurality of sections further includes a third section having a V-shaped segment and a pair of support segments, said V-shaped segment having ends opposite an apex that connect to said hooked segments between respective ends of said hooked segments, said pair of support segments respectively extending from transition portions of said V-shaped segment to a base segment to which said apex is connected, and
a first of said at least two crush zones is formed by said first and second sections and a second of said at least two crush zones is formed by said second and third sections.

* * * * *

UNITED STATES PATENT AND TRADEMARK OFFICE
CERTIFICATE OF CORRECTION

PATENT NO. : 7,441,806 B2 Page 1 of 1
APPLICATION NO. : 11/552428
DATED : October 28, 2008
INVENTOR(S) : Patrick J. Ellison

It is certified that error appears in the above-identified patent and that said Letters Patent is hereby corrected as shown below:

In claim 12, at Column 10, line 60, replace "1angled" with --angled--.

In claim 17, at Column 11, line 19, replace "said a second" with --said second--.

Signed and Sealed this

Sixth Day of January, 2009

JON W. DUDAS
*Director of the United States Patent and Trademark Office*